(12) United States Patent
Lueckemeier

(10) Patent No.: US 10,139,576 B2
(45) Date of Patent: Nov. 27, 2018

(54) OPTICAL CONNECTOR

(71) Applicant: HARTING ELECTRONICS GMBH, Espelkamp (DE)

(72) Inventor: Martin Lueckemeier, Diepenau (DE)

(73) Assignee: HARTING ELECTRONICS GMBH (DE)

( * ) Notice: Subject to any disclaimer, the term of this patent is extended or adjusted under 35 U.S.C. 154(b) by 0 days.

(21) Appl. No.: 15/735,105

(22) PCT Filed: Jul. 7, 2016

(86) PCT No.: PCT/DE2016/100301
§ 371 (c)(1),
(2) Date: Dec. 8, 2017

(87) PCT Pub. No.: WO2017/012606
PCT Pub. Date: Jan. 26, 2017

(65) Prior Publication Data
US 2018/0180824 A1   Jun. 28, 2018

(30) Foreign Application Priority Data
Jul. 20, 2015 (DE) .......................... 10 2015 111 705

(51) Int. Cl.
G02B 6/38       (2006.01)
G02B 6/32       (2006.01)

(52) U.S. Cl.
CPC ............. *G02B 6/3893* (2013.01); *G02B 6/32* (2013.01); *G02B 6/383* (2013.01); *G02B 6/387* (2013.01); *G02B 6/3838* (2013.01); *G02B 6/3873* (2013.01)

(58) Field of Classification Search
CPC ........ G02B 6/3893; G02B 6/32; G02B 6/383; G02B 6/3838

(Continued)

(56) References Cited

U.S. PATENT DOCUMENTS 3,757,102 A * 9/1973 Roberts ................... F21V 33/00
                                                            340/815.49
4,538,202 A * 8/1985 Ferguson ................. H01T 4/10
                                                            337/17

(Continued)

FOREIGN PATENT DOCUMENTS

DE     37 29 075     3/1989    ............... G02B 6/36
DE     198 11 705    9/1999    ............... G02B 6/38

(Continued)

OTHER PUBLICATIONS

German Office Action issued in corresponding German Patent Appln. Serial No. 10 2015 111 705.3 dated Apr. 12, 2016, 7 pgs.

(Continued)

*Primary Examiner* — Jerry Blevins
(74) *Attorney, Agent, or Firm* — Hayes Soloway P.C.

(57) ABSTRACT

A plug connector has a cylindrical housing body having at least one step, which forms two different regions each having different housing diameters, wherein the region having the smaller diameter forms a plug-in region and the region having the larger diameter forms a socket region, wherein the plug connector has a lock, which is captively connected to the housing body, wherein the plug connector has an actuator, which is operatively connected to the lock, wherein the plug connector has a plugging positioner, which at least partially surrounds the plug-in region. An attachment flange fits the plug connector and has an insertion region designed as a hollow cylinder, wherein the inner region of the hollow cylinder has at least one step, which forms two different regions each having different inside diameters, wherein the inner region of the insertion region is unthreaded.

21 Claims, 3 Drawing Sheets

(58) Field of Classification Search
USPC .......................................................... 385/62
See application file for complete search history.

(56) References Cited

U.S. PATENT DOCUMENTS

| | | | |
|---|---|---|---|
| 4,911,523 | A | 3/1990 | Sondergeld et al. ...... 350/96.21 |
| 6,254,281 | B1 | 7/2001 | Huber et al. .................... 385/73 |
| 2005/0215101 | A1* | 9/2005 | Pepe .................... G02B 6/3807 439/281 |
| 2009/0060420 | A1* | 3/2009 | Cull ...................... G02B 6/383 385/62 |
| 2014/0212096 | A1 | 7/2014 | Wei et al. ....................... 385/81 |
| 2015/0078714 | A1* | 3/2015 | Isenhour ............. G02B 6/4204 385/93 |
| 2015/0234126 | A1 | 8/2015 | Haase et al. ........... G02B 6/398 |

FOREIGN PATENT DOCUMENTS

| | | | | |
|---|---|---|---|---|
| DE | 10 2013 105 777 | 12/2014 | ............... | G02B 6/38 |
| EP | 0 053 914 | 12/1981 | ............... | G02B 7/26 |
| EP | 0 114 230 | 11/1983 | ............... | G02B 7/26 |
| GB | 2 408 350 | 11/2003 | ............... | G02B 6/32 |
| KR | 2011 0021615 | 3/2011 | ............... | G02B 6/36 |

OTHER PUBLICATIONS

International Preliminary Report on Patentability issued in corresponding PCT Patent Appln. Serial No. PCT/DE2016/100301, with English translation, dated Jan. 23, 2018, 7 pgs.

International Search Report and Written Opinion issued in corresponding PCT Patent Appln. Serial No. PCT/DE2016/100301, with English translation, dated Oct. 4, 2016, 18 pgs.

\* cited by examiner

OPTICAL CONNECTOR

BACKGROUND OF THE INVENTION

The invention proceeds from an optical plug-in connector, having a first plug part and a second plug part which can be latched to said first plug part, wherein the optical plug-in connector has, along a plug axis, a plug-in region in a front region and a connection region in a rear region.

Optical plug-in connectors of this kind are required in order to establish a releasable connection between two optical conductors or cables and to release said connection again. Coupling of two optical conductors is very complicated since the connection has to be free of contaminants and is therefore highly susceptible to faults.

The light exit and light entry areas of the optical conductors have to be extremely clean and free of contaminants in order for contact to be made. In the plug-connected state, it is also necessary to ensure that, as far as possible, no contaminants, moisture or dust come into contact with the contact points. Any kind of foreign body on the coupling point between the conductors has an adverse effect on the transmission accuracy of the plug-in connector.

In order to reduce the influence of foreign bodies on the transmission point, so-called beam widening is often used in optical plug-in connectors. In this case, the optical beam which exits from the optical conductor is widened by means of a lens. The diameter of the light beam is increased in size and oriented in parallel by the lens. Contaminants made up of small particles are smaller in relation to the light beam with its relatively large cross section obtained in this way. The widened light beam is therefore less sensitive to contaminants, soiling and moisture than the light beam in its original size. Therefore, optically widened light beams are advantageously used in the field of optical plug-in connectors.

One problem with plug-in connectors of this kind is created by the production method. A high degree of accuracy is required for producing optical plug-in connectors which are intended to widen an optical beam, transmit said optical beam and focus said optical beam again. Many traditional production methods, such as injection-molding methods for example, are highly inaccurate for this purpose.

The primary reason for this is that, in the injection-molding method, different areas of the article produced are provided in different moldings. When these different moldings are assembled, relatively large tolerances occur, these tolerances being transferred to the manufactured article.

OBJECT OF THE INVENTION

The object of the invention is to present an optical plug-in connector which has very low tolerances and therefore allows contact to be made and transmission of an optical signal possibly in an accurate manner without losses such that they are not susceptible to faults. The plug-in connector should furthermore consist of as few components as possible to enable simple assembly.

SUMMARY OF THE INVENTION

The invention concerns an optical plug-in connector which consists of two parts and is formed from a first plug part and a second plug part. The plug parts, when latched to one another, form a front plug-in region and a rear connection region along a plug axis.

The plug-in region of the optical plug-in connector forms an optical lens, and also a first guide and a second guide. In this case, the first guide and the second guide are oriented parallel in relation to one another. The first guide and the second guide form an angle of greater than 0 degrees in relation to the plug axis, and therefore the guides do not run parallel to the plug axis.

The connection region of the optical plug-in connector has a cable guide, a braid guide and a contact region. In this case, the cable guide and the braid guide are oriented parallel in relation to one another. At the same time, the cable guide and the braid guide form the plug axis. In this case, the braid guide adjoins the cable guide in an axially symmetrical manner in the direction of the plug-in side of the plug-in connector. In turn, the contact region is adjacent to the braid guide. At the same time, the contact region forms the transition between the connection region and the plug-in region.

Therefore, a cable can be inserted into the cable guide in the connection region of the optical plug-in connector. A fiber of the cable is further guided through the braid guide and ends in the contact region. An optical coupling gel is applied in the contact region. Said optical coupling gel allows advantageous, optical coupling of the optical fiber on the rear side of the lens in the plug-in region.

In an advantageous embodiment, a clamping arm is provided in the connection region of the optical plug-in connector. The clamping arm has at least one clamping means which is intended to clamp and fix the cable in the cable guide. In this case, the clamping arm can be fixed such that the clamping means pushes slightly into the cable and in this way allows the cable to be fixed in a force-fitting manner by virtue of the cable firstly being held by the clamping means and secondly being pressed into the cable guide by the clamping means.

The clamping arm is advantageously fastened to the first plug part by way of a film hinge. As a result, the clamping arm can be opened—moved away from the cable guide—and closed—moved toward the cable guide. At the same time, no additional component is required.

So that the fiber can also be correctly guided and fixed in the braid guide, the optical plug-in connector has, in the connection region, a braid guide means which acts on the braid guide and a fiber which is accommodated in said braid guide. In this case, the braid guide means is designed with a spring-elastic action, and therefore it can exert a pressure onto the fiber of a cable and in this way can push said fiber into the braid guide and fix said fiber in said braid guide.

In a particularly advantageous embodiment, the braid guide means is formed from one or more spring-elastic lamellae in this case. Owing to the plurality of lamellae, which each exert a low pressure onto the fiber, the fiber is therefore not damaged and at the same time exerts a sufficient contact-pressure for fixing purposes.

The braid guide means is advantageously integrally formed on the second plug part, so that the braid guide means act on the braid guide at the first plug part by connecting the first plug part to the second plug part. Owing to this arrangement, a fiber which is held in the braid guide means can likewise be removed, without being destroyed, by releasing the first and second plug part from one another.

One advantageous embodiment of the invention provides that the contact region is arranged on the rear side of the plug-in region for the purpose of making contact with an optical fiber. Therefore, an optical fiber can be brought into contact with the first plug part in the contact region. The use of an optically transmissive material for the first plug part is particularly advantageous. Therefore, the optical beam can be forwarded in the first plug part and exit at the plug-in region which is in the form of a lens.

In an advantageous embodiment, the lens in the plug-in region of the first plug part is designed such that the optical beam exits from the first plug part in a parallel, widened manner. In this case, the beam exits from the lens at an angle in relation to the plug axis. An angle which corresponds to the angle of the first guide and of the second guide is particularly advantageous. Therefore, the parallel, widened beam runs parallel in relation to the first and second guide. As a result, accurate plug connection of two plug-in connectors is possible, without losses between the two lenses.

The invention is particularly advantageously suitable for a precisely fitting plug connection without losses since the optical lens, the first and second guide, the braid guide and the contact region are integrally combined in the first plug part. In this case, the first plug part is composed of an optically transmissive and conductive material. The refractive index of the material should be greater than 1, that is to say have a greater refraction than air. An optically transmissive polymer should preferably be used here. All of these constituent parts are important for accurate orientation of the optical beam. Therefore, production in an injection-molding process which allows a particularly high degree of accuracy of said constituent parts in relation to one another is possible.

In order to be able to make the degree of accuracy of the constituent parts of the first plug part in relation to one another even better, it is particularly advantageous to design the optical lens, the first guide, the second guide, the braid guide and the contact region to be accessible from one direction, that said elements can be removed from a mold from the same direction in the injection-molding process. Therefore, an even greater degree of accuracy can be achieved.

The optical plug-in connector is preferably of hermaphroditic design. Two latching lugs are provided in the plug-in region for this purpose. A first latching lug is formed on a spring arm, and a second latching lug is formed directly on the plug-in region of the first plug part. In this case, the first latching lug is provided in a corresponding manner to the second latching lug. That is to say that the first latching lug of a first optical plug-in connector and the second latching lug of a second plug-in connector engage one in the other. Therefore, two identical plug-in connectors can be connected to one another in a manner rotated through 180° in relation to one another.

At the same time, the first guide and the second guide are designed in a manner corresponding to one another in the plug-in region. That is to say that the first guide of a first plug-in connector is guided in the second guide of a second plugin connector. Since the guides and the widened light beam run parallel in relation to one another, the insertion depth of the two optical plug-in connectors in relation to one another is irrelevant. Signal transmission can always be performed with the same quality on account of the precise tolerances between lens and guide. In addition, transmission is less susceptible to soiling and environmental influences owing to the widened beam.

BRIEF DESCRIPTION OF THE DRAWINGS

An exemplary embodiment of the invention is illustrated in the drawings and will be explained in greater detail in the text which follows. In the drawing:

The figures contain partly simplified, schematic illustrations. In some cases, identical reference symbols are used for elements which are similar but may not be identical. Different views of the same elements may be drawn to different scales.

FIG. 1 is a perspective illustration of a first plug part 1a of an optical plug-in connector 1 according to the present invention. In this case, the first plug part 1a is integrally produced from an optically transmissive and conductive polymer. The first plug part forms a first guide 11 and also a second guide 12. The first guide 11 and the second guide 12 are arranged parallel in relation to one another and are located in a plug-in region 2 of the plug-in connector 1.

DETAILED DESCRIPTION OF THE INVENTION

Figure 1:
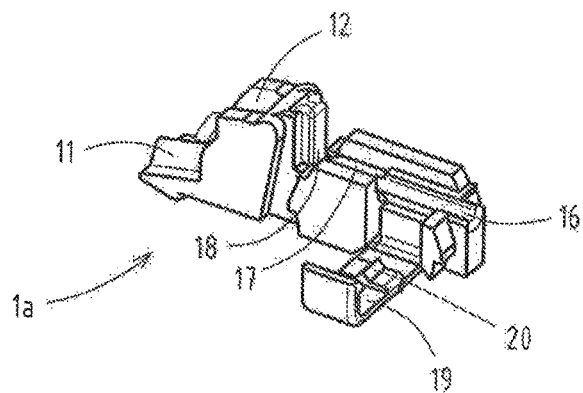
FIG. 1 is a perspective illustration of a first plug part.

The first plug part 1a has a contact region 18 on the rear side, in a connection region 3 of the plug-in connector 1. A braid guide 17 and a cable guide 16 which adjoins said braid guide extend directly following the contact region 18.

A clamping arm 19 is integrally formed on the first plug part 1a at the side of the cable guide 16 by means of a film hinge 21. The clamping arm 19 is connected to the plug part 1a in a movable manner by means of the film hinge 21. A clamping means 20 is integrally formed on the clamping arm 19 in facing to the first plug part 1a.

Figure 2:
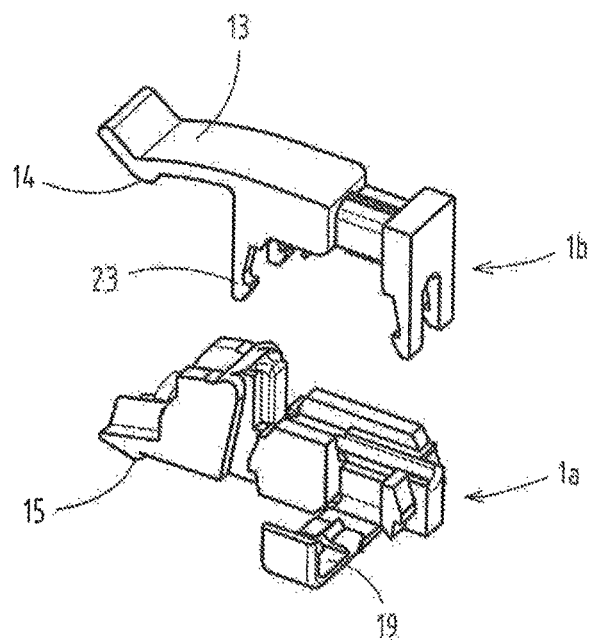
FIG. 2 shows an exploded view of an optical plug-in connector.

FIG. 2 is an exploded illustration of a first plug part 1a with a second plug part 1b. The second plug part 1b has four latching arms 23 by way of which the second plug part 1b can be latched on the first plug part 1a.

Figure 6:
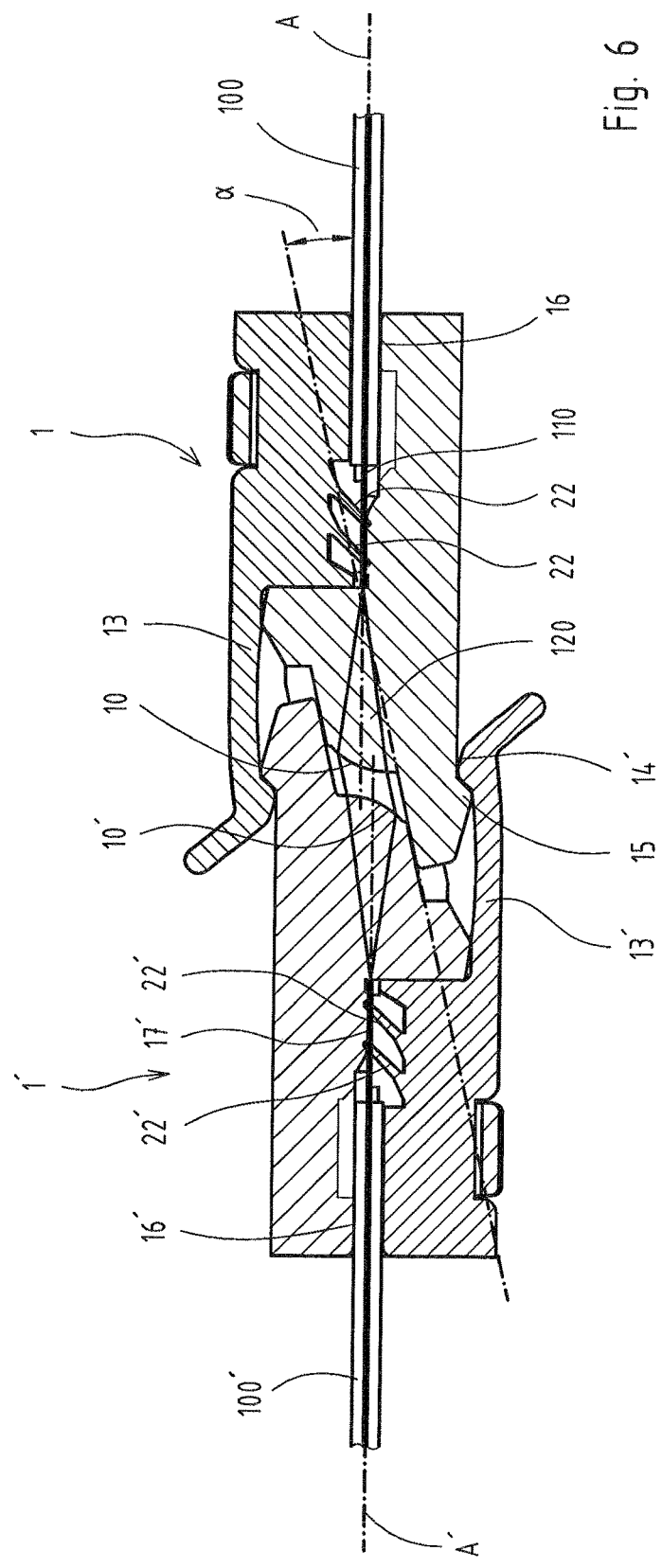
FIG. 6 is a sectional illustration through two, contact-connected optical plug-in connectors.

The first plug part 1a has a second latching lug 15 in the region of the guides 11, 12. Said second latching lug is designed in a corresponding manner to a first latching lug 14. In this case, the first latching lug 14 is provided on the spring arm 13. The latching lugs 14, 15 of two plug-in connectors 1 can therefore latch with one another in a hermaphroditic manner, as illustrated in FIG. 6.

Figure 3:
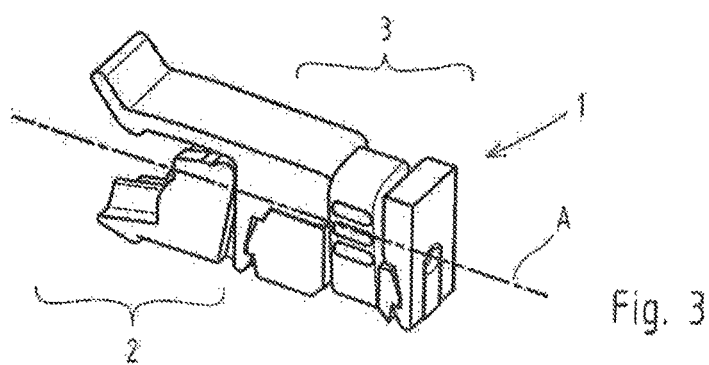
FIG. 3 shows an optical plug-in connector.

FIG. 3 shows a plug-in connector 1. The second plug part 1b is latched onto the first plug part 1a. The left-hand region forms a plug-in region 2 which is adjoined by a connection region 3 in plug axis A. The plug-in region 2 is provided for making contact with a second plug-in connector 1, wherein the connection region 3 is designed for the connection of a cable 100. The clamping arm 19 is placed over the second plug part 1b in order to hold said second plug part on the first plug part 1a.

Figure 4:
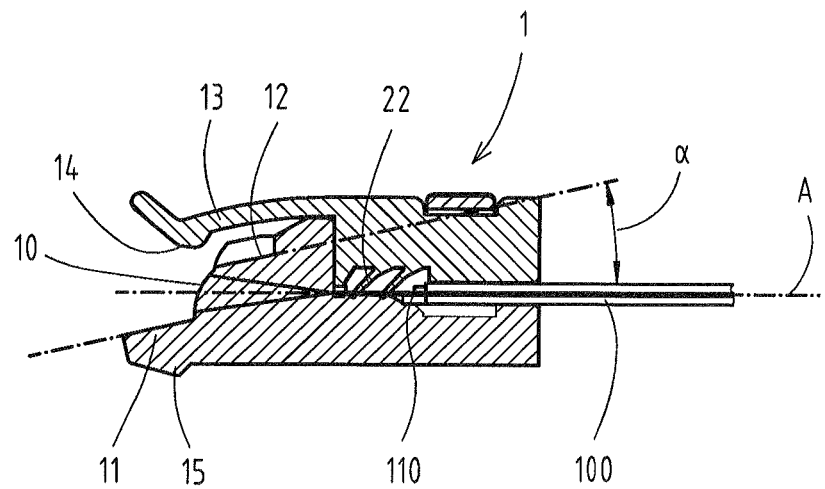
FIG. 4 is a sectional illustration through an optical plug-in connector with a cable connected.

FIG. 4 is a sectional illustration along the plug axis A through a plug-in connector 1 with cable 100 connected. The spring arm 13 with integrally formed, first latching lug 14 is shown in the plug-in region illustrated at the front-left. The first latching lug 14 is designed in a corresponding manner to the second latching lug 15 (see FIG. 6).

The first guide 11 and the second guide 12 are arranged between the spring arm 13 and the second latching lug 15. The guides 11, 12 are oriented at an angle $\alpha$ in relation to the plug axis A. The lens 10 is formed on the first plug part 1a between the first guide 11 and the second guide 12. The lens 10 is provided such that an exiting light beam 120 runs parallel in relation to the first guide 11 and second guide 12. By virtue of arranging the constituent parts at an angle, it is possible to remove the entire first plug part 1a from an injection mold in one direction (here at the top). This is necessary for particularly small tolerances.

A cable 100 is inserted into the cable guide 16 of the plug-in connector 1 in the rear connection region 3 of the plug-in connector 1. Here, the cable 100 is fixed by means of the clamping means 20. The optical bevel 110 which runs in the cable 100 is held by means of the braid guide means 22 at the free end in the braid receptacle 17.

Figure 5:
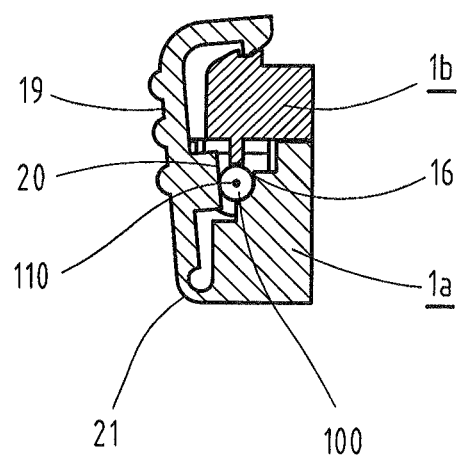
FIG. 5 is a further sectional illustration through an optical plug-in connector with a cable connected.

FIG. 5 illustrates a further cross section through the plug-in connector 1. Here, the section runs transverse to the plug axis A. Said figure shows the clamping arm 19 which engages over the second plug part 1b and secures said second plug part in this way. The clamping arm 19 is integrally formed on the first plug part 1a in a movable manner by means of the film hinge 21. The cable 100 is held and fixed in the cable guide 16 of the plug-in connector 1 by the clamping means 20.

FIG. 6 is a sectional illustration through two identical plug-in connectors 1, 1' according to the present invention which are connected to one another. In the two plug-in connectors 1, 1', a cable 100, 100' is in each case inserted into the plug-in connector 1, and fixed in the cable guide 16, 16' in the connection region 3, 3'. Said figure also shows the braid guide means 22, 22' which fix the optical fibers 110, 110' of the cables 100, 100' in the braid guide 17, 17'.

The plug-in regions 2, 2' of the plug-in connectors 1, 1' are latched to one another. The first latching lug 14, 14' latches with the respectively second latching lug 15', 15 in each case. Similarly, the first guides 11, 11' are guided on the respectively second guide 12', 12. An optical beam 120 runs parallel in relation to the guides 11, 11', 12, 12'.

The optical beam 120 is deflected by the arrangement according to the invention of the lenses 10, 10' through the same angle α at which the guides 11, 11', 12, 12' run. As a result, it is possible to balance the insertion depth of the two plug-in connectors 1, 1' in relation to one another.

LIST OF REFERENCE SYMBOLS

1 Optical plug-in connector
1a First plug part
1b Second plug part
2 Plug-in region
3 Connection region
10 Lens
11 First guide
12 Second guide
13 Spring arm
14 First latching lug
15 Second latching lug
16 Cable guide
17 Braid guide
18 Contact region
19 Clamping arm
20 Clamping means
21 Film hinge
22 Braid guide means
23 Latching arms
100 Cable
110 Optical fiber
120 Optical beam
A Plug axis
α Angle

The invention claimed is:

1. An optical fiber cable plug-in connector, having a first plug part and a second plug part which can be latched to said first plug part, wherein the optical plug-in connector has, along a plug axis (A), a plug-in region in a front region and a connection region in a rear region, wherein an optical lens, a first guide and also a second guide are formed in the plug-in region, wherein a cable guide and at least one clamping arm with a clamp are formed in the connection region, wherein the first guide and the second guide are oriented in parallel and are arranged at an angle (α) of greater than 0° in relation to the plug axis (A), and wherein the clamp is adapted to act on an optical fiber cable in the cable guide.

2. The optical fiber cable plug-in connector as claimed in claim 1, wherein
a braid guide and a contact region are also formed in the connection region.

3. The optical fiber cable plug-in connector as claimed in claim 2, wherein
the cable guide and the braid guide are oriented parallel in relation to the plug axis (A).

4. The optical fiber cable plug-in connector as claimed in claim 2, wherein
at least one guide formed in the region of the braid guide of the connection region.

5. The optical fiber cable plug-in connector as claimed in claim 4, wherein
the guide acts on the braid guide with a spring-elastic action.

6. The optical fiber cable plug-in connector as claimed in claim 4, wherein
the guide is integrally formed on the second plug part.

7. The optical fiber cable plug-in connector as claimed in claim 4, wherein
the guide is formed from elastic lamellae.

8. The optical fiber cable plug-in connector as claimed in claim 2, wherein
an optical coupling gel is arranged in the contact region.

9. The optical fiber cable plug-in connector as claimed in claim 2, wherein
the contact region is arranged on the rear side of the plug-in region and is intended to receive a free end of an optical fiber of a cable.

10. The optical fiber cable plug-in connector as claimed in claim 9, wherein
the lens is formed such that an optical beam which enters the contact region parallel in relation to the plug axis (A) exits from the lens parallel in relation to the first guide and in relation to the second guide.

11. The optical fiber cable plug-in connector as claimed in claim 2, wherein
the optical lens, the first guide, the second guide, the braid guide and the contact region are integrally formed in the first plug part.

12. The optical fiber cable plug-in connector as claimed in claim 11, wherein
the first plug part is composed of an optically transmissive polymer.

13. The optical fiber cable plug-in connector as claimed in claim 11, wherein
the optical lens, the first guide, the second guide, the braid guide and the contact region are accessible from one direction and can be removed from a mold from this direction in an injection-molding process.

14. The optical fiber cable plug-in connector as claimed in claim 1, wherein
the clamping arm is fastened to the first plug part by way of a film hinge.

15. The optical fiber cable plug-in connector as claimed in claim 1, wherein
a spring arm with a first latching lug is formed, and a second latching lug is formed in the plug-in region.

16. The optical fiber cable plug-in connector as claimed in claim 15, wherein
the first latching lug is designed in a corresponding manner to the second latching lug.

17. The optical fiber cable plug-in connector as claimed in claim 1, wherein
the optical plug-in connector is of hermaphroditic design.

18. The optical fiber cable plug-in connector as claimed in claim 17, wherein
the first guide is designed in a corresponding manner to the second guide.

19. The optical fiber cable plug-in connector as claimed in claim 1, wherein
the angle ($\alpha$) is greater than 0° and smaller than 45°.

20. The optical fiber cable plug-in connector as claimed in claim 1, wherein
the first plug part and the second plug part are of integral design.

21. The optical fiber cable plug-in connector as claimed in claim 20, wherein
the second plug part is integrally formed on the clamping arm of the first plug part.

* * * * *